United States Patent
Hoff et al.

(10) Patent No.: US 7,242,311 B2
(45) Date of Patent: Jul. 10, 2007

(54) METHOD AND SYSTEM FOR PROVIDING WORK MACHINE MULTI-FUNCTIONAL USER INTERFACE

(75) Inventors: Brian D. Hoff, Peoria, IL (US); Sivaprasad Akasam, Peoria, IL (US); Thomas M. Baker, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 203 days.

(21) Appl. No.: 10/975,989

(22) Filed: Oct. 29, 2004

(65) Prior Publication Data

US 2006/0092033 A1 May 4, 2006

(51) Int. Cl.
*G08B 21/00* (2006.01)

(52) U.S. Cl. .................. 340/679; 340/691.6; 340/438; 340/439; 340/425.5; 340/459; 340/461; 701/14; 701/35

(58) Field of Classification Search ............... 340/679, 340/691.6, 653, 661, 680, 425.5, 438, 439, 340/686.1, 459, 461, 945; 701/29, 31, 14, 701/35; 702/173, 176; 703/3, 7
See application file for complete search history.

(56) References Cited

U.S. PATENT DOCUMENTS

| | | | |
|---|---|---|---|
| 5,325,082 A | 6/1994 | Rodriguez | |
| 5,432,413 A | 7/1995 | Duke et al. | |
| 5,555,171 A | 9/1996 | Sonehara et al. | |
| 6,038,498 A * | 3/2000 | Briffe et al. | 701/3 |
| 6,055,468 A | 4/2000 | Kaman et al. | |
| 6,320,497 B1 * | 11/2001 | Fukumoto et al. | 340/425.5 |
| 6,332,434 B1 | 12/2001 | De Souza et al. | |
| 6,343,237 B1 | 1/2002 | Rossow et al. | |
| 6,363,304 B1 | 3/2002 | Ramsey | |
| 6,535,802 B1 | 3/2003 | Kramer | |
| 6,546,363 B1 * | 4/2003 | Hagenbuch | 703/7 |
| 6,553,290 B1 | 4/2003 | Pillar | |
| 6,587,768 B2 | 7/2003 | Chene et al. | |
| 6,621,412 B1 * | 9/2003 | Markle et al. | 340/517 |
| 6,677,854 B2 * | 1/2004 | Dix | 340/438 |
| 6,700,482 B2 | 3/2004 | Ververs et al. | |
| 6,714,846 B2 | 3/2004 | Trsar et al. | |
| 6,804,618 B2 * | 10/2004 | Junk | 702/77 |
| 2002/0138184 A1 | 9/2002 | Kipersztok et al. | |
| 2002/0198639 A1 | 12/2002 | Ellis et al. | |
| 2003/0060949 A1 | 3/2003 | Letang et al. | |

(Continued)

FOREIGN PATENT DOCUMENTS

JP 06011419 A 1/1994

*Primary Examiner*—Hung Nguyen
(74) *Attorney, Agent, or Firm*—Finnegan, Henderson, Farabow, Garrett & Dunner

(57) ABSTRACT

A method is performed to provide a multi-functional user interface on a work machine for displaying suggested corrective action. The process includes receiving status information associated with the work machine and analyzing the status information to determine an abnormal condition. The process also includes displaying a warning message on the display device indicating the abnormal condition and determining one or more corrective actions to handle the abnormal condition. Further, the process includes determining an appropriate corrective action among the one or more corrective actions and displaying a recommendation message on the display device reflecting the appropriate corrective action. The process may also include displaying a list including the remaining one or more corrective actions on the display device to provide alternative actions to an operator.

15 Claims, 9 Drawing Sheets

U.S. PATENT DOCUMENTS

| | | |
|---|---|---|
| 2003/0125852 A1 | 7/2003 | Schade et al. |
| 2003/0158638 A1 | 8/2003 | Yakes et al. |
| 2003/0167111 A1 | 9/2003 | Kipersztok et al. |
| 2004/0002794 A1 | 1/2004 | Pillar et al. |
| 2004/0024502 A1 | 2/2004 | Squires et al. |
| 2004/0039510 A1 | 2/2004 | Archer et al. |
| 2004/0085198 A1 | 5/2004 | Saito et al. |

* cited by examiner

METHOD AND SYSTEM FOR PROVIDING WORK MACHINE MULTI-FUNCTIONAL USER INTERFACE

U.S. GOVERNMENT RIGHTS

This invention was made with government support under the terms of Contract No. DE-FC36-0IGO11095 awarded by the Department of Energy. The government may have certain rights to this invention.

TECHNICAL FIELD

This disclosure relates generally to work machine control consoles, and more particularly to systems and methods for providing recommended corrective actions and troubleshooting interfaces for work machine operators.

BACKGROUND

An important feature in modern work machines (e.g., fixed and mobile commercial machines, such as construction machines, fixed engine systems, marine-based machines, etc.) is the operator display. Work machines may have a variety of optional work tools that can be attached to and controlled by the work machine. These optional work tools can be relatively complicated and difficult to operate. Each work tool may have different operator interfaces with numerous controls for position, orientation, and other associated features and functions. Operator displays often provide user friendly interfaces that can help operators understand what actions or steps should be taken when operating a certain type of work tool or when warning conditions occur.

One example of an operator display is described in U.S. Pat. No. 6,343,237 to Rossow et al. (the '237 patent), which includes a display device for displaying the status of a number of vital functions associated with a power machine. The '237 patent describes a user interface that allows an operator to view active warning conditions and help screens designed to assist the operator in deciphering the active warnings. Although the '237 patent provides assistance in the form of user interfaces, these interfaces cannot recommend corrective actions to the operator. Moreover, when new technologies such as fuel cell systems are implemented on these work machines, the help information presented in these user interfaces is often too difficult to understand by untrained operators.

The disclosed multi-functional user interface is directed to solving one or more of the problems set forth above.

SUMMARY OF THE INVENTION

In one embodiment, a method is performed to provide a multi-functional user interface on a work machine for displaying suggested corrective action. The process includes receiving status information associated with the work machine and analyzing the status information to determine an abnormal condition. The process also includes displaying a warning message on the display device indicating the abnormal condition and determining one or more corrective actions to handle the abnormal condition. Further, the process includes determining an appropriate corrective action among the one or more corrective actions and displaying a recommendation message on the display device reflecting the appropriate corrective action.

In another embodiment, a system is provided for providing a multi-functional user interface on a work machine. The system may include a user interactive display device having a display screen including a first display area, a second display area, and a third display area, one or more sensors to provide status information of the work machine, and a control module. The control module may further include a memory containing program code that performs an operation process when executed, and a microprocessor to execute the program code. Further, the operation process includes receiving status information associated with the work machine, analyzing the status information to determine an abnormal condition, and displaying a warning message on the display device indicating the abnormal condition. The operation process may also include determining one or more corrective actions to handle the abnormal condition, determining an appropriate corrective action among the one or more corrective actions, and displaying a recommendation message on the display device reflecting the appropriate corrective action.

BRIEF DESCRIPTION OF THE DRAWINGS

The accompanying drawings, which are incorporated in and constitute a part of this specification, illustrate several embodiments and together with the description, serve to explain the principles of the disclosed embodiments. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
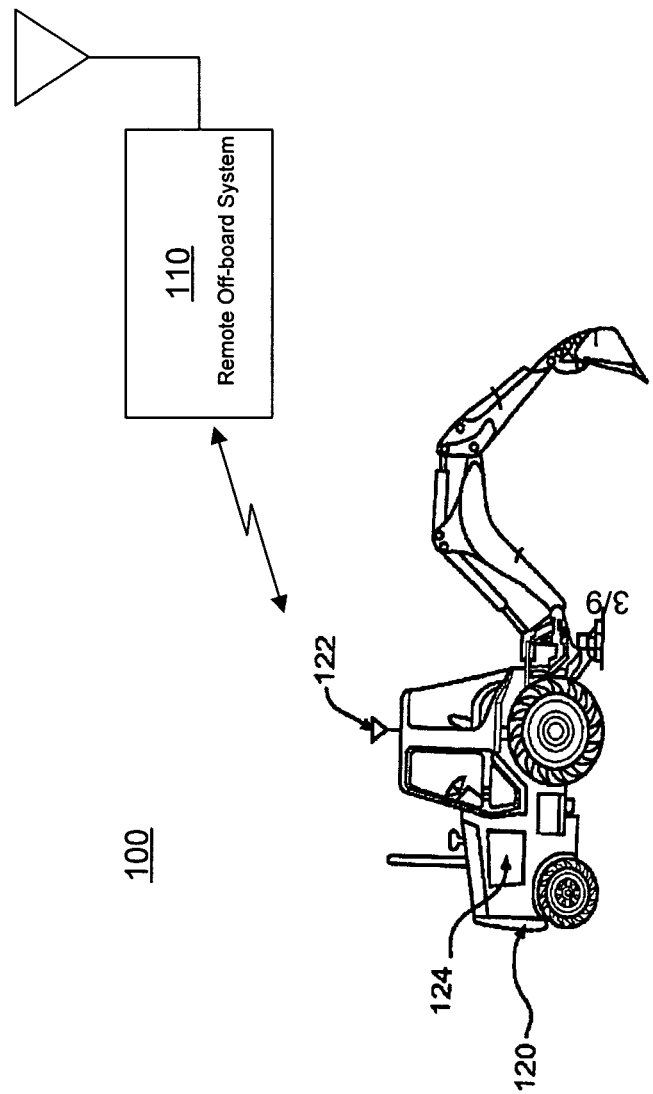
FIG. 1 is a pictorial illustration of an exemplary system that may be configured to perform certain functions consistent with certain disclosed embodiments.

FIG. 1 illustrates an exemplary work machine environment 100 in which features and principles consistent with certain disclosed embodiments may be implemented. As shown in FIG. 1, a work machine environment 100 may include a remote off-board system 110 and a work machine 120. Work machine 120 may use an on-board system 124 to communicate with off-board system 110 through a wireless interface 122. Although only one work machine 120 and one off-board system 110 are shown, environment 100 may include any number and types of such machines and/or off-board systems.

Work machine 120 refers to a fixed or mobile machine that performs some type of operation associated with a particular industry, such as mining, construction, farming, etc. and operates between or within work environments (e.g., construction site, mine site, power plants, etc.). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. As shown in FIG. 1, work machine 120 is a backhoe type work machine. In certain embodiments, work machine 120 may be a hybrid electric and fuel cell powered work machine. The type of work machine illustrated in FIG. 1 is exemplary and not intended to be limiting. It is contemplated by the disclosed embodiments that environment 100 may implement any number of different types of work machines.

Off-board system 110 may represent a system that is located remotely from work machine 120. Off-board system 110 may connect to work machine 120 through wire or wireless data links to act as a management station. For example, off-board system 110 may include Web browser software that requests and receives data from a server when executed by a processor and displays content to a user operating the system. A user may also control certain aspects of on-board systems using control commands sent from off-board system 110 to targeted on-board systems.

On-board system 124 may represent a system of one or more on-board modules, interface systems, data links, and other types of components that perform machine processes within work machine 120. On-board system 124 may also include communication devices for communicating with different types of off-board systems. As shown in FIG. 1, on-board system 124 includes a wireless communication device 122 to remotely communicate with off-board system 110.

Figure 2:
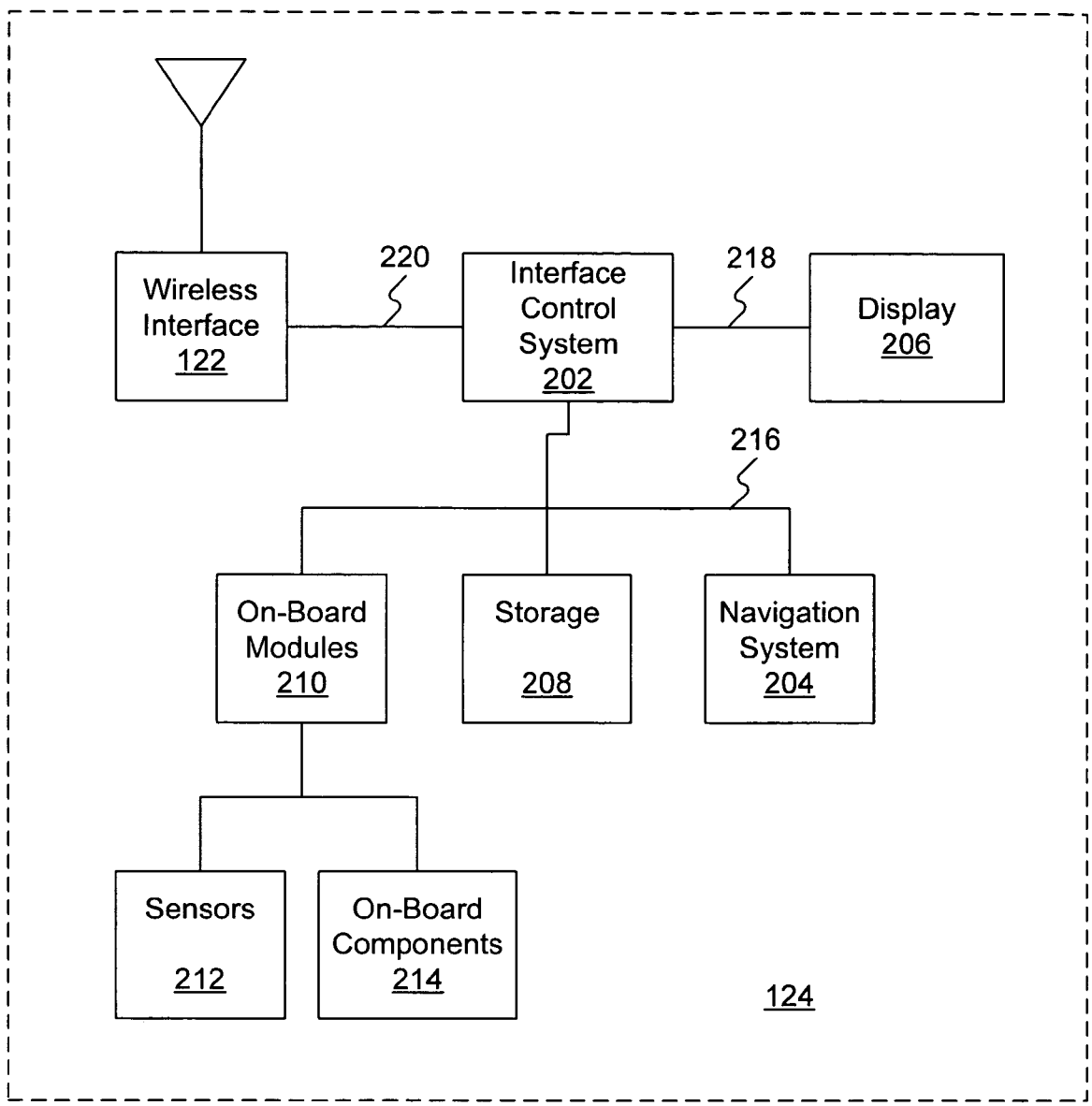
FIG. 2 illustrates a block diagram of an on-board system on a work machine consistent with certain disclosed embodiments.

FIG. 2 illustrates a block diagram of on-board system 124 consistent with certain disclosed embodiments. As shown in FIG. 2, on-board system 124 may include a wireless interface 122, an interface control system 202, a display 206, a navigation system 204, a storage 208, on-board modules 210, sensors 212, on-board components 214, and data links 216, 218, and 220.

On-board modules 210 may include one or more control modules or interface modules within work machine 120 that control sensors 212 and on-board components 214 or other types of sub-components. For example, on-board modules 210 may include an Engine Control Module (ECM), a power system control module, a Global Positioning System (GPS) interface device, an attachment interface that connects one or more sub-components, and any other type of device that work machine 120 may use to facilitate and/or monitor operations of the machine during run time or non-run time conditions (i.e., machine engine running or not running, respectively).

Sensors 212 may include a variety of physical sensors monitoring safety and operational conditions of work machine 120, such as hydrogen detection sensors, temperature sensors, voltage and current sensors, speed sensors, flow sensors, position sensors including GPS position sensors, radar based sensors, laser based sensors, and any other type of sensor that work machine 120 may need to monitor operations of the machine. On-board components 214 may represent one or more components that receive data, control signals, commands, and/or information from on-board modules 210. On-board components 214 may represent different types of work machine components that perform various operations associated with the type of work machine 120. For example, on-board components 214 may include one or more engine components and one or more transmission type components.

Interface control system 202 may be an on-board computer system providing control functions to other modules within on-board system 124. Interface control system 202 also provides interface functions between work machine 120 and off-board system 110. Further, interface control system 202 may include work machine specific components configured to support particular work machine functionalities.

In one embodiment, interface control system 202 may collect work data from sensors 212, on-board components 214, and on-board modules 210, and process the collected work data. Work data may include, for example, information associated with fuel consumption, load weight, propulsion torque vs. speed history vs. vehicle position, duty cycle information for power consuming components, idle time, number of engine starts, load type, work machine type, terrain type, terrain grade, type of material manipulated by work machine 120, hours of operation, fluid levels, fluid consumptions, work site parameter data, and any other type of information related to work machine 120, a work site, and/or operations associated with the work site. In certain embodiments, work data may also include information related to hybrid electric/fuel cell powered work machine 120, such as fuel cell capacity, fuel cell voltage and current, high voltage battery capacity, fuel cell temperature, etc. Interface control system 202 may also transmit work data to off-board system 110 for further processing via wireless interface 122.

Wireless interface 122 may be one or more wireless communication modules configured to establish communication channels between off-board system 110 and on-board system 124. Wireless interface 122 may also use different radio technologies to connect more than one off-board system 110. Data link 220 may be provided for data and command exchanges between interface control system 202 and wireless interface 122.

It should be noted that although embodiments are disclosed with respect to a wireless interface, work machine 120 may be configured with a wired interface (not shown) that establishes communication channels in a manner similar to wireless interface 122, albeit, through a wired communication medium. Therefore, the disclosed embodiments are not limited to wireless communication environments.

Navigation system 204 may represent any type of navigation system suitable for use on work machine 120. Navigation system 204 may use on-board global positioning systems (GPS) (not shown), and/or other geographical software data and applications to provide navigation information to an operator of work machine 120. Storage 208 may be any type of storage system including but not limited to, a hard disk storage module, a CD-ROM/RAM storage module, a DVD-ROM/RAM storage module, solid state storage module (e.g., compact flash card module), and/or any combination thereof. Storage 208 may include a removable memory module, or a fixed memory module, or a combination of removable and fixed memory modules. Storage 208 may also store operation manuals, map data, navigation data, performance and duty cycle history data, user specific information, workplace specific information, vehicle specific information, such as any limitations due to vehicle damage or maintenance, and any other type of information associated with work machine 120, and/or a geographical area affiliated with work machine 120.

Display 206 may include any type of display device that presents information. In one embodiment, display 206 may be mounted on an operator console within a cabin of work machine 120. For example, display 206 may be a touch screen display device that displays information to an operator of work machine 120 and receives instructions from the operator. Display 206 may be coupled to interface control system 202 through data link 218 to receive display data. Display 206 may also include functional keys or buttons (not shown) for operators to operate display 206 in different modes such as navigation mode or system display mode. Display 206 may include one or more display screens or display devices.

Interface control system 202, on-board modules 210, storage 208, and navigation system 204 are interconnected by data link 216. Data link 216 may represent a proprietary or non-proprietary data link, such as a Society of Automotive Engineers (SAE) standard data link including Controller Area Network (CAN), J1939, etc. Through data link 216, interface control system 202 may control on-board modules 210 according to pre-programmed procedures. Interface control system 202 may also control sensors 212 and on-board components 214 through on-board modules 210.

Interface control system 202 may also perform various data processing functions and maintain data for use by one or more on-board modules 210 or off-board system 110. For example, interface control system 202 may be configured to perform protocol conversions (e.g., tunneling and translations) and message routing services for on-board data links. Further, through data link 216, devices other than interface control system 202 may be able to access display 206. For example, navigation system 204 may use display 206 for navigation operations such as showing a map. Interface control system 202 may also provide user input to other devices via data link 216.

Figure 3:
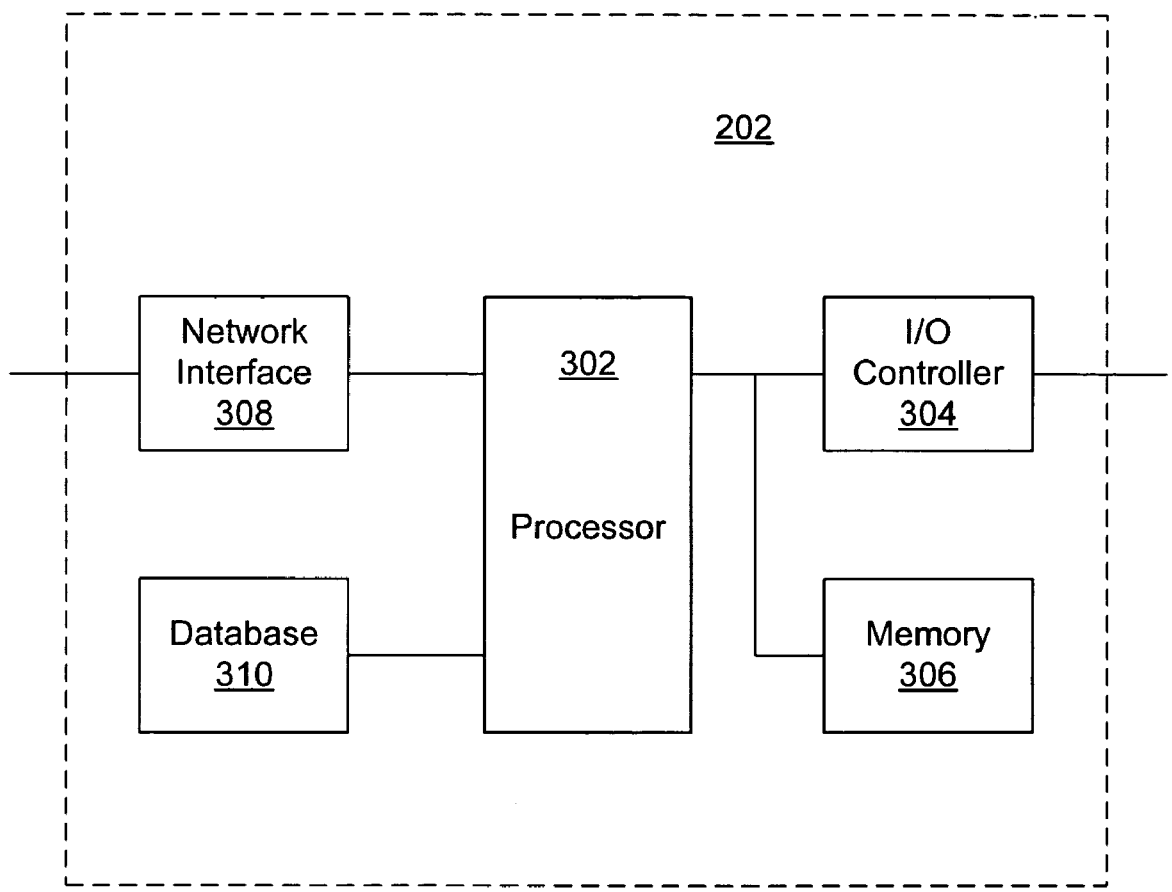
FIG. 3 illustrates a functional diagram of an interface control system within the on-board system.

FIG. 3 shows a functional block diagram of an exemplary interface control system 202 consistent with the disclosed embodiments. As shown in FIG. 3, interface control system 202 may include a processor 302, an I/O controller 304, a memory 306, a network interface 308, and a database 310. Processor 302 may be a general purpose microprocessor or a microcontroller unit with internal memory and I/O units. Memory 306 may be one or more memory devices including, but not limited to, ROM, flash memory, dynamic RAM, and static RAM. Memory 306 may include removable or fixed memory modules, or a combination of removable and fixed memory modules. Memory 306 may be configured to store information used by processor 302, such as program code and data required for performing startup and operation.

I/O controller 304 controls interfaces to data links 216, 218, and 220. Database 310 may be one or more storage devices that store information used by processor 302 to perform complex information processing, determine operator actions under certain operational conditions (e.g., normal, abnormal, and emergency), and create machine intelligence for handling abnormal conditions of work machine 120. Although database 310 is shown as a separate element, it may be implemented with memory 306 or as a storage device external to interface control system 202.

Processor 302 may execute one or more software programs stored in memory 306 for performing data collection and data processing tasks consistent with certain disclosed embodiments. For example, processor 302 may execute a software program to collect and display information reflecting the ground speed of work machine 120. Further, in embodiments encompassing fuel cell powered work machines, processor 302 may execute software programs for collecting data from an on-board fuel cell control module or a voltage/current sensor and to display fuel-cell generator status information on display 206.

Processor 302 may also execute software programs to monitor abnormal operational conditions and to display warning information on display 206. For example, processor 302 may collect oil pressure information from on-board modules 210. Processor 302 may then display the warning information to indicate to an operator that the oil pressure is outside of threshold values. Further, Processor 302 may automatically execute software programs to respond to normal, abnormal, or emergency conditions to help an operator maintain or place work machine 120 in a safer condition, or prevent work machine 120 from operating out of a safe operating range.

In certain embodiments, processor 302 may also execute software programs to recommend corrective actions corresponding to the warning information. The corrective actions may include recommendations for altering the operation of work machine 120. For instance, in addition to providing display data reflecting warning information for a particular abnormal operational condition, processor 302 may generate suggested courses of actions that the operator of work machine 120 may perform to correct the abnormal condition. To better illustrate this feature, consider an example of a hybrid electric/fuel cell powered work machine that is experiencing an abnormal operational condition, such as a fuel cell producing low voltages or a humidity level of a manifold component exceeding normal data ranges. Merely indicating the faulty fuel cell is at certain voltage level (e.g., voltage level of fuel cell no. 238=0.68V) or the manifold humidity is at a certain humidity level (e.g., H2 manifold humidity level=0.86%) may not provide meaningful information to an inexperienced operator. Accordingly, methods and systems consistent with the disclosed embodiments may provide recommendations of corrective actions to address these exemplary abnormal operations. For example, if fuel cell voltages are low, processor 302 may recommend that the operator reduce power produced by work machine 120 by either slowing down or reducing load or reduce power consumed by other components of work machine 120. Other forms of corrective action may include suggestions to switch to alternate sources of power (e.g., batteries) or scheduling service for work machine 120. Recommended actions may be similar to those found in troubleshooting manuals of work machine 120.

If more than one corrective action can be performed to address certain abnormal conditions, processor 302 may determine and recommend a corrective action considered to be the most appropriate. Further, processor 302 may generate data that lists other available corrective actions available to the operator. The operator may select an appropriate corrective action from the list of alternate actions that may be displayed on display 206.

An operator may also perform troubleshooting on work machine 120 when abnormal conditions occur. In such instances, processor 302 may generate display data that enables the operator to input or select troubleshooting steps on display 206. Processor 302 then analyzes the operator's selections received from display 206 and generates control commands corresponding to the troubleshooting steps selected by the operator. The control commands are then sent to the determined modules or components within work machine 120 to perform operations associated with the commands. For instance, processor 302 may execute a process that interprets the operator's selections to produce control commands for determined components within work machine 120.

Further, processor 302 may provide a hypertext markup language (HTML) hypertext menu on display 206 to facilitate troubleshooting processes. Using the hypertext, an operator can perform troubleshooting by touching or selecting menu items on display 206. Moreover, since off-board system 110 can communicate with on-board system 124 through wireless interface 122, troubleshooting procedures may be performed remotely at off-board system 110. Accordingly, individuals remote from work machine may leverage off-board system 110 to perform troubleshooting on work machine 120. HTML hypertext menus may also be provided to facilitate other processes as well, such as maintenance, operating, service, and/or recommendation processes.

Additionally, an operator of work machine 120 may access service information associated with work machine 120 stored on off-board system 110. Service information may refer to any information regarding history of work machine 120, such as maintenance work, repair work, and/or related information. Interface control system 202 may execute processes that download service information from off-board system 110 through the communication established by interface 122. Further, an operator of work machine 120 may access maintenance and operation manuals for work machine 120 through display 206. In one embodiment, maintenance and operation manuals may be stored in a storage device within work machine 120, such as storage 208. Also, new versions of the manuals may be downloaded from off-board system 110 to work machine 120 through interface control system 202. Therefore, maintenance and operation manuals on work machine 120 are kept updated to facilitate operation and maintenance of work machine 120.

As explained, methods and systems consistent with disclosed embodiments may perform one or more processes for detecting abnormal operational conditions for work machine 120, analyzing the conditions, determining corrective actions associated with the abnormal conditions, and provide user interfaces for facilitating operator input and review of the abnormal conditions and suggested corrective actions. Further, as mentioned above, warning information associated with an abnormal condition may not be sufficient for an operator to assess how to eliminate the condition. Accordingly, embodiments allow work machine 120 to suggest corrective actions to the operator that reflect meaningful information for addressing an abnormal condition. To better describe these features of the disclosed embodiments, the following description is disclosed in connection with a hybrid electric/fuel cell powered work machine. It should be noted that the disclosed embodiments are not limited to these types of work machines and that the described processes may be implemented in any type of machine that may experience an abnormal condition.

Figure 4:
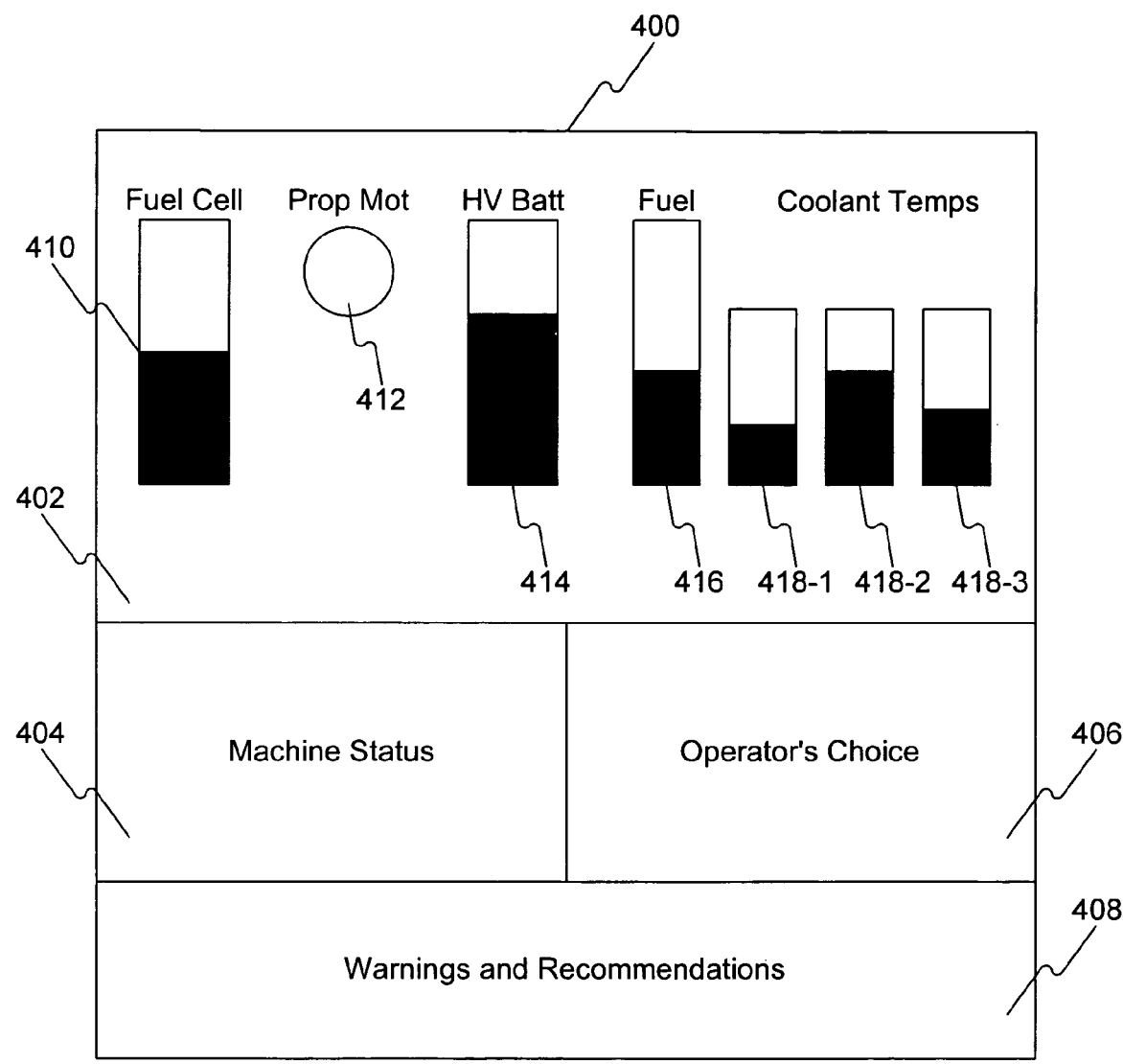
FIG. 4 illustrates an exemplary display screen consistent with certain disclosed embodiments.

FIG. 4 shows an exemplary display screen 400 that may be rendered by display 206 for a hybrid electric/fuel cell powered work machine when work machine 120 is performing processes consistent with certain disclosed embodiments. As shown in FIG. 4, display screen 400 may include four display areas: a fuel cell status display area 402, a work machine status display area 404, a operator's choice display area 406, and a warnings and recommendations display area 408, although the number and size of display areas may vary. Display screen 400 is exemplary and not intended to be limiting. Embodiments may provide different types of display areas reflecting different operational parameters, characteristics, conditions, etc., associated with work machine 120. For instance, fuel cell status display area 402 and work machine status display area 404 may be combined to be referred to as a system status display area. Further, display screen 400 may be used to display several pages (i.e., a main page and one or more sub-pages) accessible by buttons, knobs, dials, or a touch screen. Under certain abnormal or emergency conditions, display screen 400 may be used to switch display to the main page, or to display warnings and corrective actions use the entire display screen.

In certain embodiments, display area 402 may include various status indicators on a fuel cell generator and other relative modules. For example, display area 402 may include a fuel cell indicator 410 reflecting total fuel cell power available, fuel cell power being used, and voltage and current readings. Display area 402 may also include an indicator 412 reflecting motor status, and an indicator 414 reflecting high voltage battery status, such as rate of charge and discharge, and voltage and current readings. Further, display area 402 may include an indicator 416 reflecting fuel capacity, and various coolant temperature indicators 418-1, 418-2, and 418-3 reflecting temperature readings on fuel cell coolant, motor coolant, and hydraulic coolant, respectively.

Figure 5:
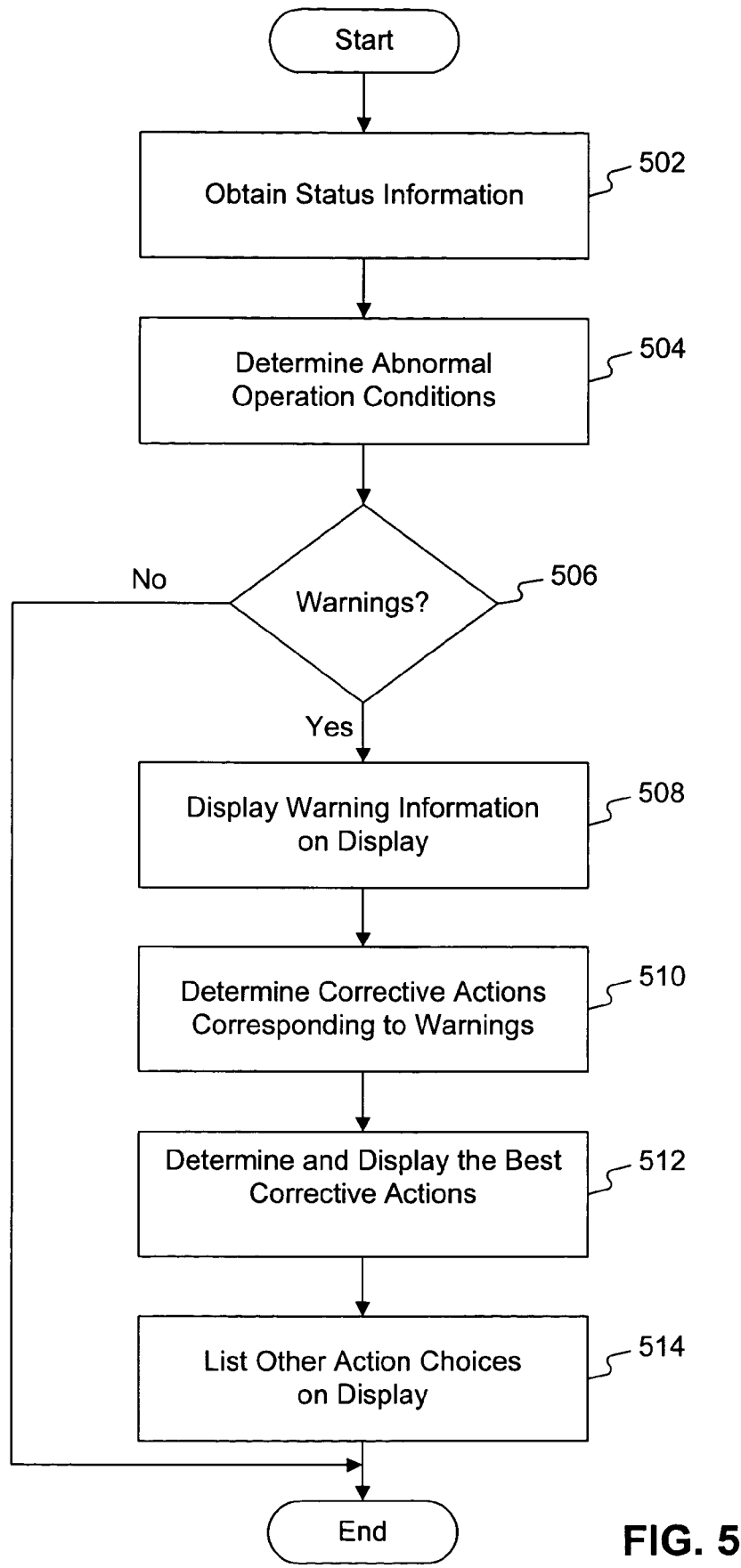
FIG. 5 illustrates a flowchart of an exemplary operation process performed by the interface control system.

FIG. 5 illustrates a flowchart of an exemplary operation process that may be performed by interface control system 202, more specifically, by processor 302 within interface control system 202 consistent with certain disclosed embodiments. Initially, processor 302 obtains status information from sensors 212, on-board components 214, and on-board modules 210 (step 502). After obtaining the status information, processor 302 processes the status information and determines if any abnormal operation conditions exist (step 504). For example, processor 302, after processing voltage readings of all fuel cells, may determine that a low fuel cell power condition exists. In order to determine the low fuel cell power condition, processor 302 may access data stored in database 310 or compare voltage readings with a predetermined threshold. After determining an abnormal operation condition, processor 302 may determine whether to generate a warning associated with work machine 120 (step 506). If processor 302 determines to generate the warning (step 506; yes), processor 302 may generate a warning message to be displayed on display area 408 (step 508). In certain embodiments, processor 302 may not generate a warning. This may occur when corrective actions are automatically performed by work machine 120 to address the condition (step 506; no). In this case, processor 302 may generate explanation messages reflecting the action performed by work machine 120 to rectify the detected abnormal condition. The explanation messages may be displayed to the operator on display area 408.

Processor 302 may also determine one or more corrective actions corresponding to the abnormal condition that initiated the warning (step 510). In order to determine the corrective actions, processor 302 may execute certain analysis programs or access data stored in database 310. If processor 302 determines multiple corrective actions can be performed in response to the warning, processor 302 further determines the appropriate corrective action based on predetermined criteria, such as the most fuel efficient, the lowest risk, or any types of criteria predefined by work machine manufactures or operators. Processor 302 may then display the appropriate corrective action as a recommended action on display area 408 (step 512). After processor 302 recommends the appropriate corrective action, processor 302 may also list any other corrective actions available to the operator on display area 406 (step 514). The operator can either perform the recommended corrective action or choose an optional corrective action to handle the abnormal condition.

Figure 6:
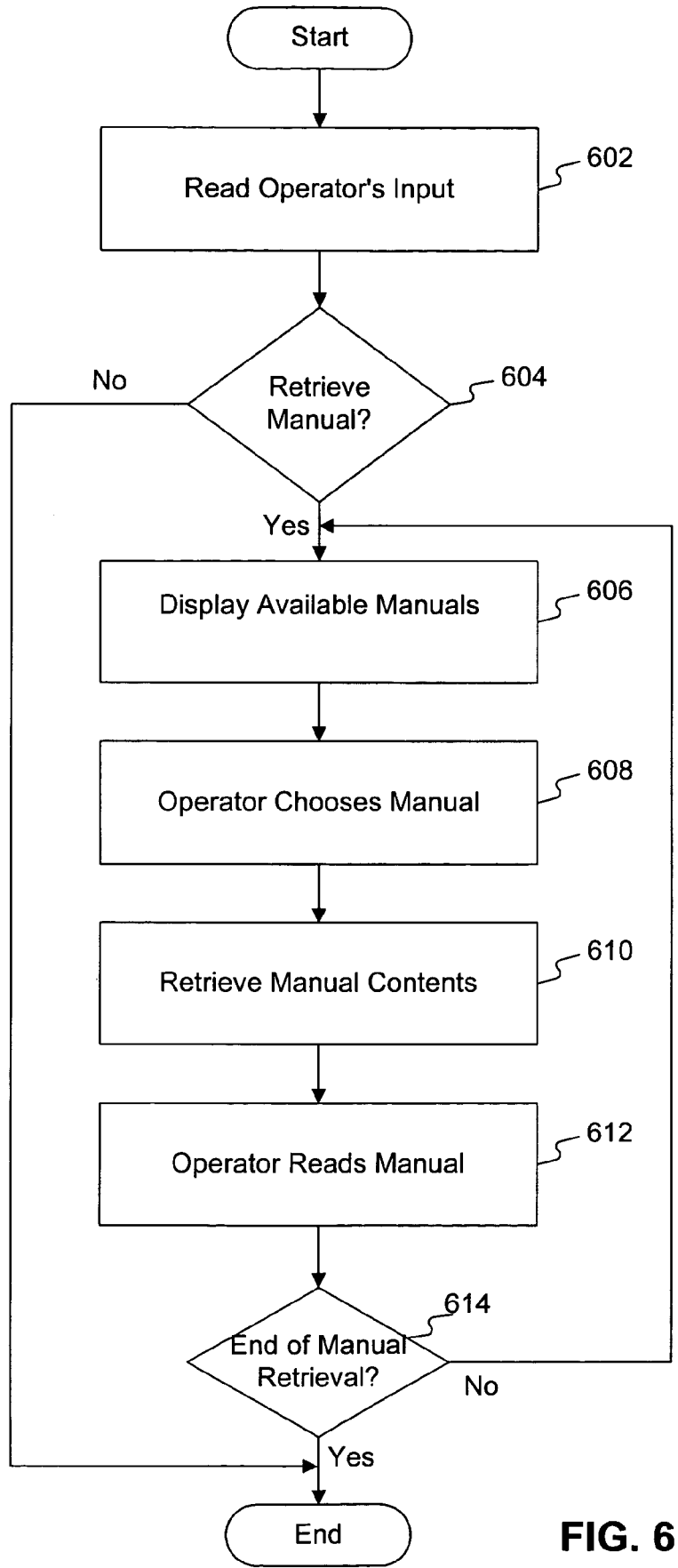
FIG. 6 illustrates a flowchart of an exemplary operation manual retrieving process performed by the interface control system.

In other embodiments, work machine 120 may also provide other service information to an operator via display 206. FIG. 6 illustrates a flowchart of an exemplary operation manual retrieving process that may be performed by processor 302. As shown in FIG. 6, processor 302 reads an operator's input from display 206 (step 602). After processor 302 gets the input from the operator, processor 302 determines whether the input is a request for retrieving a maintenance and operation manual (step 604). If processor 302 determines the input is not an operation manual retrieving request (step 604; no), processor 302 completes the operation manual retrieving process. On the other hand, if processor 302 determines the input is an operation manual retrieving request (step 604; yes), processor 302 may search database 310 for available maintenance and operation manuals stored therein, and display a list of these available manuals on display area 408 (step 606).

After the operator chooses an available manual via display 206 (step 608), processor 302 retrieves the contents of the chosen manual (step 610). In one embodiment, the manuals may be documents with multiple links, pages, sections, etc. Accordingly, processor 302 may also alternatively list a table of contents to allow the operator to navigate through the sections to locate desired information. Additionally, the operator may use soft keys on a touch screen (not shown), function keys on display 206 (not shown), and/or knobs or scroll wheels on display 206 (not show) to scroll, skip, and bookmark pages.

Once the operator completes reading manual contents (step 612), processor 302 may determine whether the operator selects an option for viewing another manual (step 614). If no further operation manual retrieving requests are inputted (step 614; yes), processor 302 completes the operation manual retrieving process. If, however, further operation manual retrieving requests are inputted (step 614; no), the operation manual retrieving process returns to step 606 to continue retrieving manuals requested by the operator.

Figure 7:
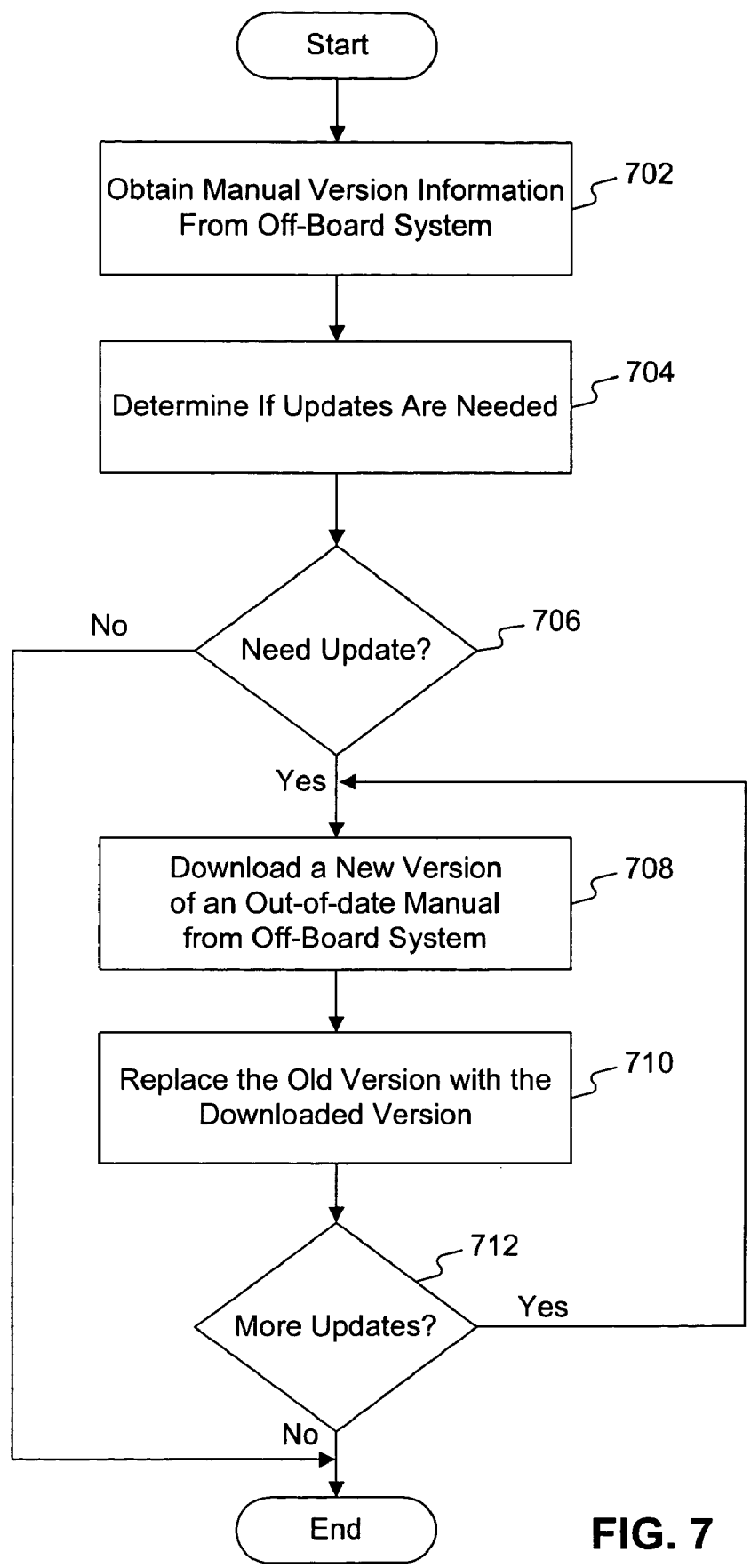
FIG. 7 illustrates a flowchart of an exemplary operation manual updating process performed by the interface control system.

In addition to operation manual retrieving, work machine 120 may also update maintenance and operation manuals electronically. FIG. 7 illustrates an exemplary manual updating process performed by processor 302 consistent with certain disclosed embodiments. As shown in FIG. 7, at the beginning of the manual updating process, processor 302 obtains version information from off-board system 110 on all available maintenance and operation manuals (step 702). After the version information is retrieved, processor 302 compares the version information retrieved with version information of current manuals stored on storage 208 to determine whether an update is required (step 704). If the versions of all maintenance and operation manuals stored in work machine 120 match the versions indicated by off-board system 110, no update is needed (step 706; no), and the manual updating process ends.

One the other hand, if the current versions do not match the versions indicated by off-board system 110 (step 706; yes), processor 302 may determine a list of these manuals in need of update. Based on the list, processor 302 may download a new version for each of the manuals included in the list from off-board system 110 (step 708), and replace the current version (i.e., old version) with the downloaded new version (step 710). Once processor 302 completes updating each manual, processor 302 determines whether more updates are needed (step 712). If no further updates are required (step 712; no), processor 302 completes the manual updating process. If, however, another manual requires updating (step 712; yes), the manual updating process returns to step 708 to continue the updating process.

Figure 8:
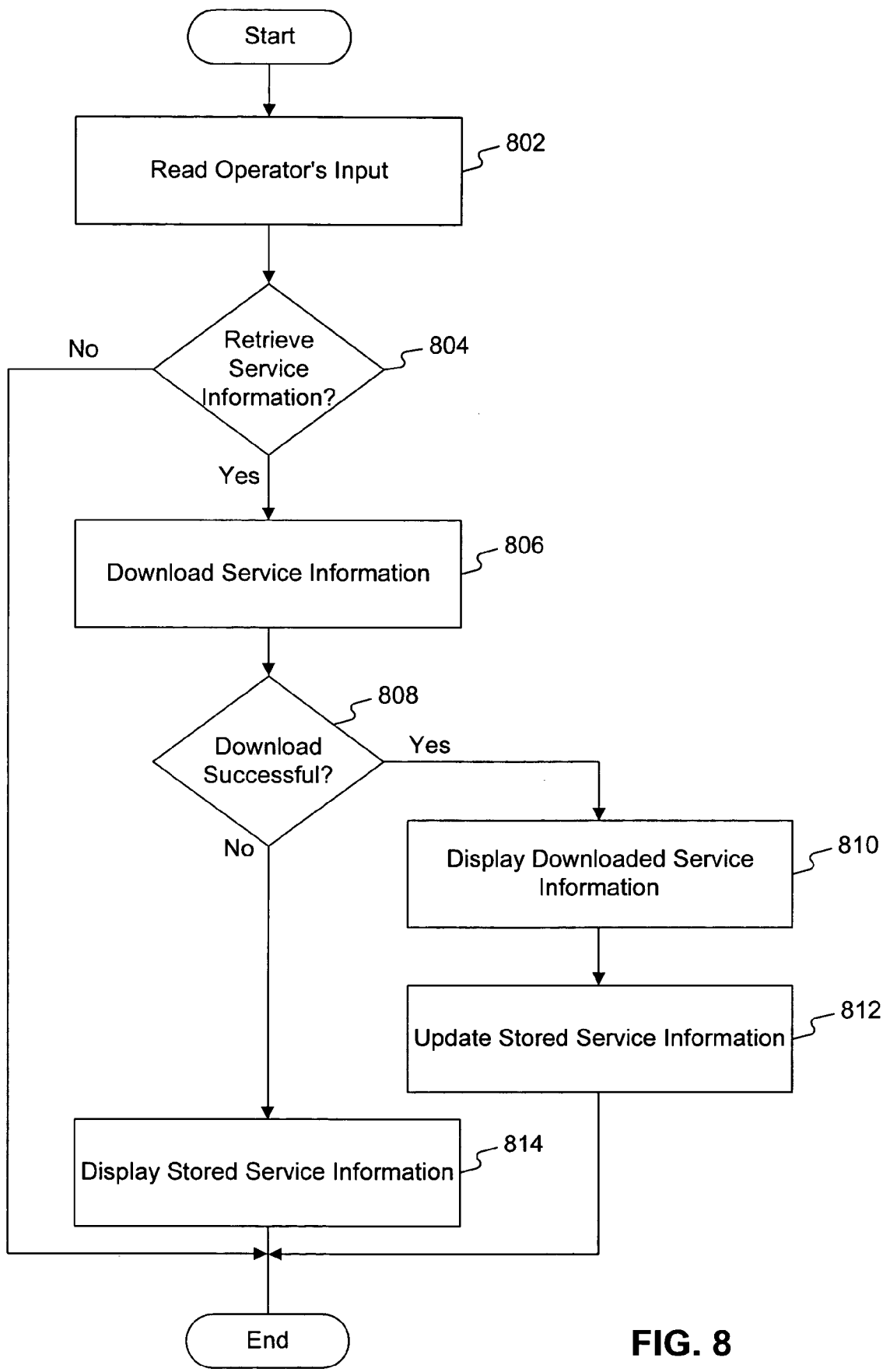
FIG. 8 illustrates a flowchart of an exemplary service information retrieving process performed by the interface control system.

Work machine 120 may also provide an operator with current service information associated with work machine 120 consistent with this embodiment. A service log may be stored on work machine 120 to document service history, and service history may be also available on work machine 120. FIG. 8 illustrates an exemplary service information retrieving process performed by processor 302. As shown in FIG. 8, processor 302 reads an operator's input from display 206 to determine if the operator requests to retrieve service information associated with work machine 120 (step 802). If the operator does not request to retrieve service information (step 804; no), the service information retrieving process ends. On the other hand, if the operator requests to retrieve service information (step 804; yes), processor 302 proceeds to download service information from off-board system 110 (step 806).

Further, processor 806 determines whether the downloading process is successful (step 808). If the downloading process is successful (step 808; yes), processor 302 displays the downloaded service information on display area 408 (step 810). After the service information is displayed, processor 302 may update the service information stored on work machine 120 with the downloaded service information (step 812). Subsequently the service retrieving process ends. If, however, processor 302 determines that the downloading process is not successful (step 808; no), processor 302 may generate a message indicating the download failure and display service information previously stored on-board (step 814). After the stored service information is displayed, processor 302 may complete the service information retrieving process.

Figure 9:
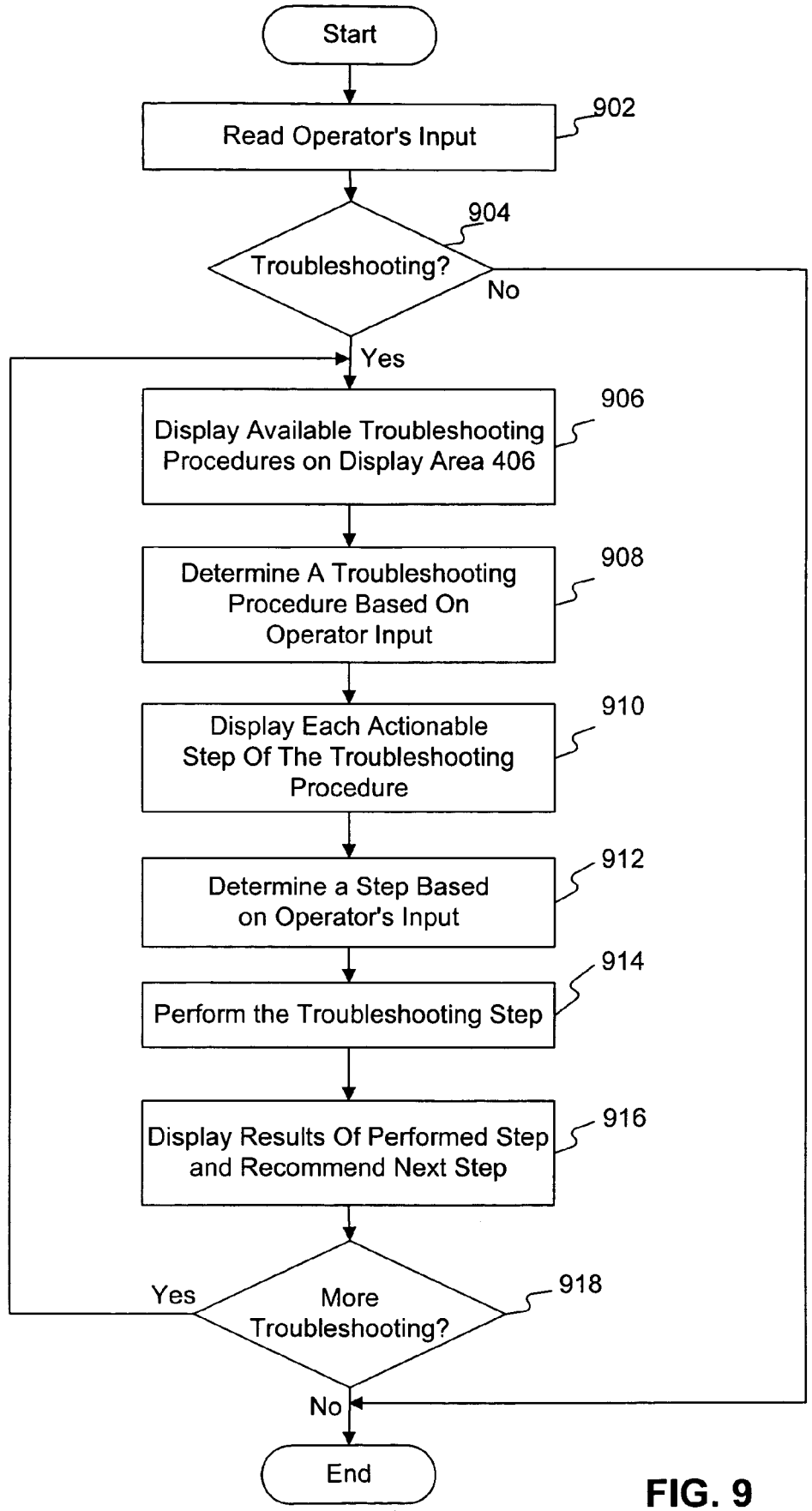
FIG. 9 illustrates a flowchart of an exemplary troubleshooting process performed by the interface control system.

Work machine 120 may further provide an operator with troubleshooting facilities through display 206. FIG. 9 illustrates an exemplary troubleshooting process performed by processor 302 consistent with this embodiment. As shown in FIG. 9, processor 302 may read an operator's input from display 206 to determine if the operator requests to perform troubleshooting (step 902). If the operator does not request troubleshooting (step 904; no), processor 302 completes the troubleshooting process. If the operator requests troubleshooting (step 904; yes), processor 302 may search database 310 for available troubleshooting procedures and display these procedures on display area 406 (step 906). Processor 302 then determines the troubleshooting procedure chosen by the operator (step 908), based on the operator's input on display 206.

Processor 302 may then display each actionable step of the troubleshooting procedure on display area 406 (step 910). For example, the actionable steps may be displayed using HTML text. Processor 302 then determines a troubleshooting step based on a selection by the operator (e.g., pressing the relevant HTML text on touch screen) (step 912). After processor 302 determines the selected troubleshooting step, processor 302 may generate control commands corresponding to the selected troubleshooting step by executing certain diagnostic software programs or by looking up database 310. Processor 302 then performs the troubleshooting step by sending the control commands to targeted devices on work machine 120 (step 914). Afterwards, processor 302 may collect status information from the target devices to determine results of the troubleshooting step and display results on display area 408. Processor 302 may further recommend subsequent troubleshooting steps on display area 408 (step 916).

After completing one troubleshooting procedure chosen by the operator, processor 302 determines whether the operator selects to perform additional troubleshooting procedures (step 918). If not (step 918; no), the troubleshooting process ends. On the other hand, if the operator requests more troubleshooting procedures (step 918; yes), the troubleshooting process returns to step 906.

INDUSTRIAL APPLICABILITY

The disclosed systems and methods may provide a multi-functional user interface on a work machine to display information associated with the operations of the work machine. This information may include suggested corrective actions associated with detected abnormal operational conditions of the work machine. Further, methods and systems may also provide maintenance and operator information in the form of manuals that are displayed on a display device. The operator may search and navigate the manuals to view information associated with the operation of the work machine. Further, the maintenance and operator manuals may be updated to ensure current information is provided to the operator. Updating the manuals may be performed through remote downloads with an off-board system.

Additionally, methods and systems consistent with the disclosed embodiments may provide troubleshooting options that may be considered by the operator. For example, certain embodiments display troubleshooting procedures on a display device based on operator navigational input. The work machine may be configured to provide troubleshooting guides in the form of active hyperlinks that enable the operator to locate appropriate troubleshooting procedures.

Other embodiments, features, aspects, and principles of the disclosed exemplary systems may be implemented in various environments and are not limited to work site environment. Embodiments other than those expressly described herein will be apparent to those skilled in the art from consideration of the specification and practice of the disclosed systems. For instance, the sequences of events described in FIGS. 5-9 are exemplary and not intended to be limiting. Thus, other method steps may be used, and even with the methods depicted in FIGS. 5-9, the particular order of events may vary without departing from the scope of the present invention. Moreover, certain steps may not be present and additional steps may be implemented in FIGS. 5-9.

What is claimed is:

1. A method for providing a multi-functional user interface on a machine equipped with a display device, comprising:
    receiving status information associated with the machine;
    analyzing the status information to determine an abnormal condition;
    determining whether the machine has automatically performed a corrective action associated with the abnormal condition;
    displaying a notification message on the display device reflecting the corrective action automatically performed by the machine;
    displaying a warning message on the display device indicating the abnormal condition if it is determined that the machine has not automatically performed the corrective action;
    determining a plurality of possible corrective actions to handle the abnormal condition;
    determining an appropriate corrective action from the plurality of possible corrective actions; and
    displaying a recommendation message on the display device reflecting the appropriate corrective action.

2. The method according to claim 1, further including:
    displaying a listing message including remaining corrective actions of the plurality of corrective actions on the display device to provide alternative actions to an operator.

3. The method according to claim 2, wherein the status information, the recommendation message and the listing message are concurrently displayed in different areas of a display screen of the display device.

4. The method according to claim 1, wherein the display screen is a touch screen.

5. The method according to claim 1, wherein the machine is a hybrid electric and fuel cell powered machine.

6. A method for providing a multi-functional user interface on a machine equipped with a display device having a display screen, comprising:
    displaying machine status information in a first display area of the display screen;
    displaying a warning message indicating an abnormal operation condition of the machine in a second display area of the display screen different from the first display area;
    displaying a recommendation message indicating suggested corrective action to respond to the abnormal operation condition in the second display area;
    displaying a listing message indicating alternative corrective actions to respond to the abnormal operation condition in a third area of the display screen different from the second display area concurrently with the recommendation message; and
    displaying troubleshooting information in the second and the third display areas of the display screen,
    wherein displaying troubleshooting information further includes:
        receiving a troubleshooting request from an operator;
        listing available troubleshooting procedures in the third display area;
        determining a troubleshooting procedure based on a selection from the operator via the display screen;
        displaying one or more steps of the troubleshooting procedure in the third display area;
        automatically performing the one or more steps of the troubleshooting procedure based on a selection from the operator; and
        displaying results of the one or more steps of the troubleshooting procedure and suggestions of further troubleshooting steps in the second display area.

7. The method according to claim 6, wherein the display screen is a touch screen.

8. The method according to claim 6, further including:
    displaying contents of one or more maintenance and operation manuals associated with the machine; and
    automatically updating the one or more maintenance and operation manuals upon requests from an operator.

9. The method according to claim 8, wherein updating further includes:
    establishing a communication connection to an off-board system containing version information associated with the one or more manuals;
    downloading the version information from the off-board system;

comparing stored version information with the version information from the off-board system to determine an out-of-date manual; and updating any out-of-date maintenance and operation manuals with the current versions of the out-of-date manuals.

10. The method according to claim 6, further including:

retrieving a remote service record of the machine from an off-board system.

11. The method according to claim 10, wherein retrieving further includes:

receiving a request from an operator of the machine to retrieve the remote service record;

establishing a communication connection to the off-board system;

downloading the remote service record from the off-board system; and displaying the remote service record from the off-board system in the second display area of the display screen.

12. The method according to claim 11, further including:

determining that the remote service record was not successfully downloaded; and displaying a service record stored on the machine.

13. A system for providing a multi-functional user interface on a machine equipped with a display device, comprising:

means for receiving status information associated with the machine;

means for displaying the status information on the display device;

means for analyzing the status information to determine an abnormal condition;

means for determining whether the machine has automatically performed a corrective action associated with the abnormal condition;

means for displaying a notification message on the display device reflecting the corrective action automatically performed by the machine;

means for displaying a warning message on the display device indicating the abnormal condition if it is determined that the machine has not automatically performed the corrective action;

means for determining one or more corrective actions to handle the abnormal condition; and means for determining an appropriate corrective action among the one or more corrective actions.

14. The system according to claim 13, further including:

means for displaying a recommendation message on the display device reflecting the appropriate corrective action.

15. The method according to claim 14, further including:

means for displaying a list including the remaining one or more corrective actions on the display device to provide alternative actions to an operator.

* * * * *